(12) United States Patent
Johri et al.

(10) Patent No.: US 10,704,618 B2
(45) Date of Patent: Jul. 7, 2020

(54) METHODS AND SYSTEM FOR OPERATING A DRIVELINE DISCONNECT CLUTCH

(71) Applicant: Ford Global Technologies, LLC, Dearborn, MI (US)

(72) Inventors: Rajit Johri, Canton, MI (US); Fazal Urrahman Syed, Canton, MI (US); Justin Panhans, Detroit, MI (US); Minku Lee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 15/785,263

(22) Filed: Oct. 16, 2017

(65) Prior Publication Data

US 2019/0113087 A1    Apr. 18, 2019

(51) Int. Cl.
| | | |
|---|---|---|
| *B60L 9/00* | (2019.01) | |
| *G05D 1/00* | (2006.01) | |
| *G05D 3/00* | (2006.01) | |
| *G06F 7/00* | (2006.01) | |
| *G06F 17/00* | (2019.01) | |
| *F16D 48/06* | (2006.01) | |
| *B60W 20/10* | (2016.01) | |
| *G06G 7/70* | (2006.01) | |
| *B60W 10/02* | (2006.01) | |
| *F16H 59/74* | (2006.01) | |

(52) U.S. Cl.
CPC .......... *F16D 48/066* (2013.01); *B60W 20/10* (2013.01); *B60W 2510/0661* (2013.01); *B60W 2540/10* (2013.01); *B60W 2540/12* (2013.01); *B60W 2710/027* (2013.01); *F16D 2500/1026* (2013.01); *F16D 2500/10412* (2013.01); *F16D 2500/1107* (2013.01); *F16D 2500/3066* (2013.01); *F16D 2500/3144* (2013.01); *F16D 2500/31426* (2013.01); *Y10S 903/946* (2013.01)

(58) Field of Classification Search
CPC ... F16D 48/066; B60W 20/10; B60W 30/192; B60W 10/02; B60W 10/026; B60W 10/06; B60W 10/11; B60W 20/00
USPC ............................... 701/22, 112; 477/5, 101
See application file for complete search history.

(56) References Cited

U.S. PATENT DOCUMENTS

| | | | |
|---|---|---|---|
| 7,896,114 B2 | 3/2011 | Colvin et al. | |
| 8,332,111 B2 | 12/2012 | McDonnell et al. | |
| 9,308,907 B2 | 4/2016 | Moon et al. | |
| 9,333,974 B1* | 5/2016 | Gibson ............... | B60W 30/192 |
| 9,475,495 B2 | 10/2016 | Nefcy et al. | |
| 9,488,267 B2 | 11/2016 | Yanakiev et al. | |
| 9,493,152 B2 | 11/2016 | Doering et al. | |
| 2004/0045611 A1* | 3/2004 | Avila ................. | G05D 16/2024 |
| | | | 137/596.17 |

(Continued)

FOREIGN PATENT DOCUMENTS

WO    2014135831 A2    9/2014

*Primary Examiner* — Mahmoud S Ismail
(74) *Attorney, Agent, or Firm* — Geoffrey Brumbaugh McCoy Russell LLP (57) ABSTRACT

Systems and methods for operating a hybrid driveline that includes an engine, a motor/generator, and a driveline disconnect clutch are described. The systems and methods may improve vehicle efficiency while providing expected vehicle operation and performance. In one example, transmission line pressure is adjusted to match driveline disconnect clutch torque capacity to driver demand torque.

12 Claims, 4 Drawing Sheets

(56) References Cited

U.S. PATENT DOCUMENTS

| | | | |
|---|---|---|---|
| 2012/0323418 A1 | 12/2012 | Sah et al. | |
| 2013/0178330 A1* | 7/2013 | Nefcy | F16D 48/06 |
| | | | 477/5 |
| 2014/0315683 A1 | 10/2014 | Roblin et al. | |
| 2015/0251652 A1* | 9/2015 | Doering | B60K 6/48 |
| | | | 477/5 |
| 2016/0032990 A1 | 2/2016 | Nedorezov et al. | |
| 2016/0039422 A1* | 2/2016 | Abington | B60W 10/06 |
| | | | 477/101 |
| 2016/0101769 A1 | 4/2016 | Gibson et al. | |
| 2016/0368485 A1 | 12/2016 | Gibson et al. | |
| 2017/0066437 A1* | 3/2017 | Yamamoto | B60K 6/48 |

* cited by examiner

METHODS AND SYSTEM FOR OPERATING A DRIVELINE DISCONNECT CLUTCH

FIELD

The present description relates to methods and a system for operating a powertrain of a hybrid vehicle. The methods and systems may be particularly useful for hybrid vehicles that include a driveline disconnect clutch.

BACKGROUND AND SUMMARY

A driveline of a hybrid vehicle may include a driveline disconnect clutch. The driveline disconnect clutch may be positioned in the driveline between an engine and an integrated starter/generator. The driveline disconnect clutch may be closed when driver demand torque request levels are high or when an electric energy storage device is being charged. The driveline disconnect clutch may be open when driver demand torque request levels are low and when an integrated starter/generator solely propels the hybrid vehicle. The driveline disconnect clutch may be hydraulically applied and released, and a transmission pump may supply pressure to apply the driveline disconnect clutch. However, operating the transmission pump to maintain the driveline disconnect clutch in a closed state may increase energy used to operate the driveline. Therefore, it may be desirable to develop a way of operating the driveline disconnect clutch in a way that may improve driveline efficiency.

The inventors herein have recognized the above-mentioned issues and have developed a driveline operating method, comprising: receiving a driver demand torque to a controller; and adjusting a torque capacity of a driveline disconnect clutch via the controller responsive to the driver demand torque and an offset torque.

By adjusting a torque capacity of a driveline disconnect clutch responsive to driver demand torque, it may be possible to improve driveline efficiency while providing expected driveline disconnect clutch operation. In particular, transmission line pressure (e.g., hydraulic pressure output of a transmission pump, which may be regulated via a pressure regulator or via adjusting transmission pump efficiency) may be adjusted to provide a driveline disconnect clutch torque capacity that is a function of driver demand torque and a torque offset. In one example, the disconnect clutch torque capacity is a greater of a requested engine torque and an actual engine torque plus an offset torque, and the requested engine torque is a driver demand torque minus an energy management torque. In this way, transmission line pressure may be controlled to close the driveline disconnect clutch and maintain the driveline disconnect clutch closed without slipping while not having to operate with transmission line pressure at a maximum value. In other words, the transmission line pressure may be adjusted to hold the driveline disconnect clutch closed with little additional force to keep the driveline disconnect clutch closed.

The present description may provide several advantages. Specifically, the approach may provide increased driveline efficiency. Further, the approach may extend the duration of a driveline component's life cycle. Additionally, the approach hold the driveline disconnect clutch closed during static and dynamic driver demand torque conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
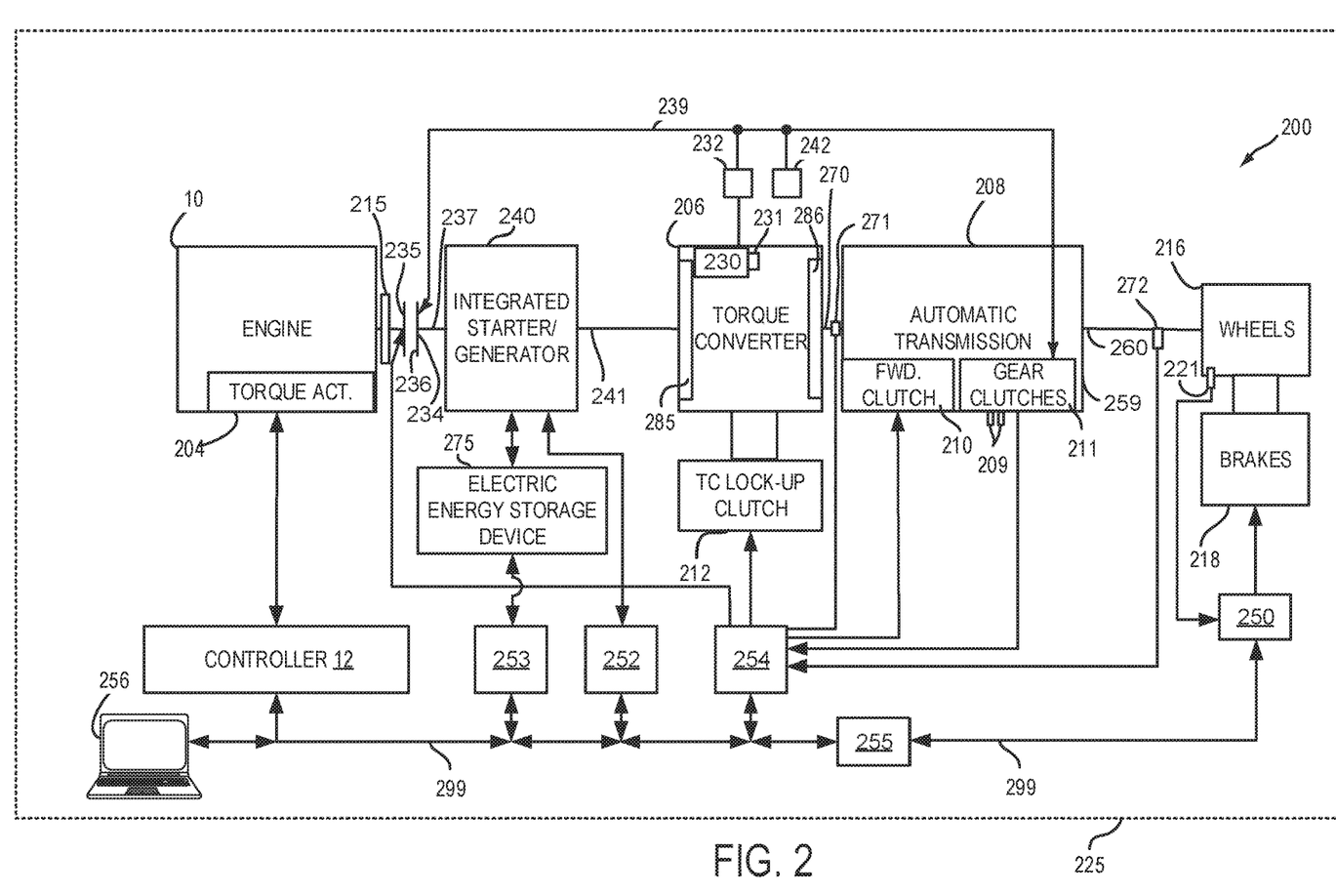
FIG. 2 is a schematic diagram of a hybrid vehicle powertrain.
Figure 3:
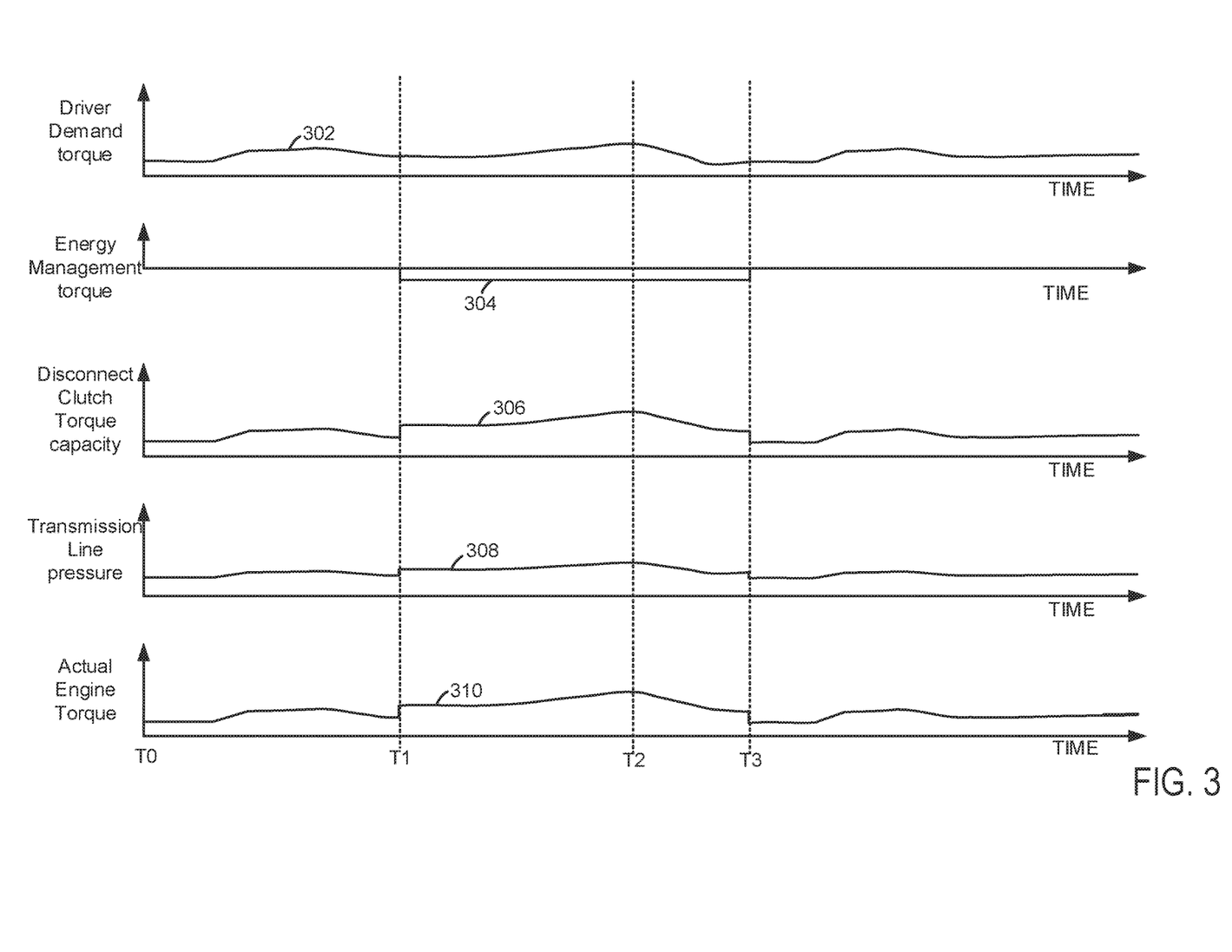
FIG. 3 is a plot showing an example prophetic driveline operating sequence.

The present description is related to improving driveline efficiency of a hybrid vehicle while providing expected functionality. Transmission hydraulic line pressure may be adjusted to hold a driveline disconnect clutch closed while matching torque capacity of the driveline disconnect clutch with engine output torque. In one example, the engine may be of the type shown in FIG. 1. The engine and an integrated starter/generator may be incorporated into a driveline as is shown in FIG. 2. The driveline may be operated as shown in FIG. 3 and according to the method of FIG. 4 to provide desired driveline disconnect clutch operation while improving driveline efficiency.

Figure 1:
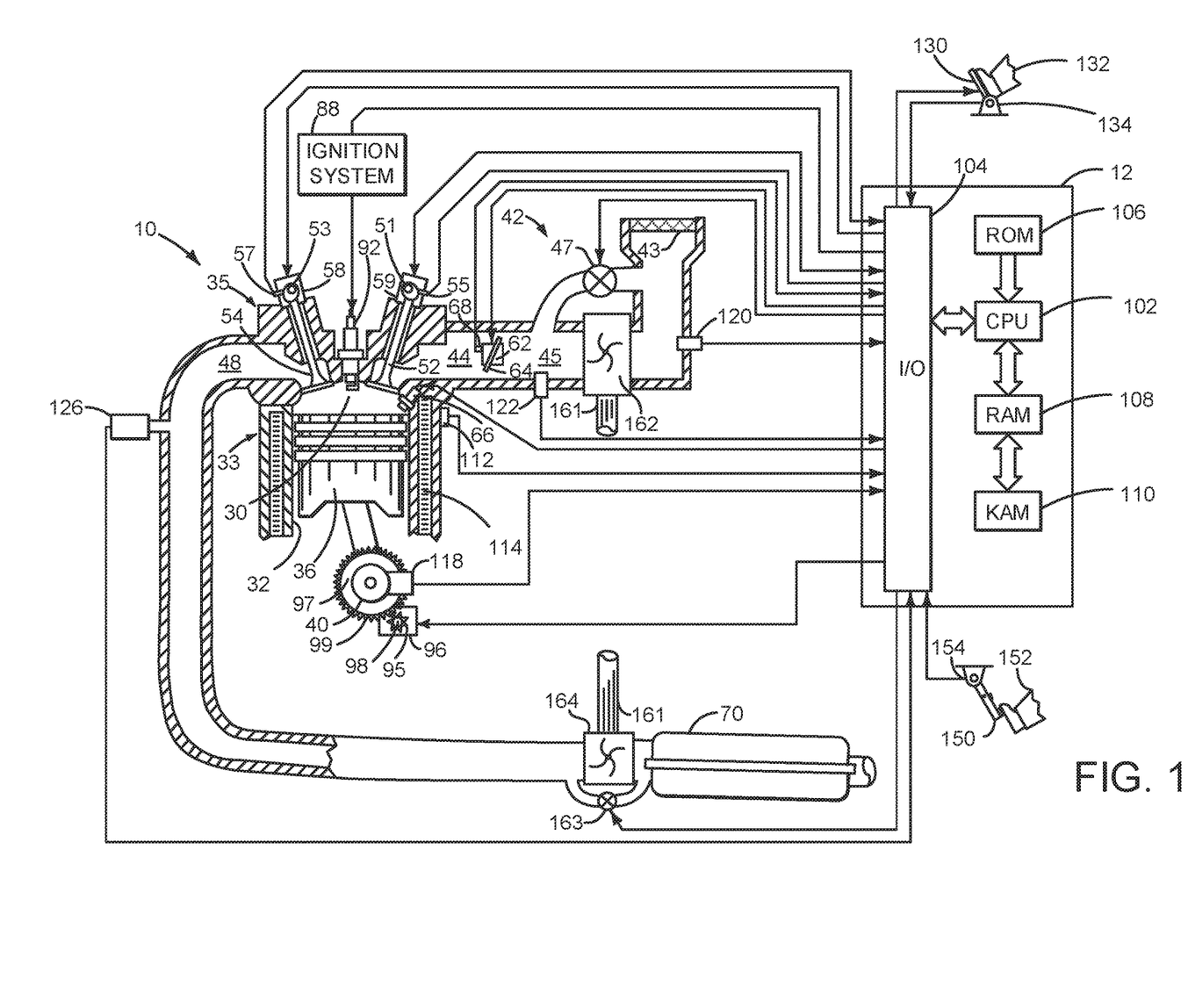
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions. Status information may be provided to a driver via human/machine interface 256 (e.g., keyboard and display).

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, powertrain control devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237. In this example, disconnect clutch 236 may be hydraulically actuated via hydraulic fluid supplied by mechanically driven transmission pump 230. Alternatively, hydraulic fluid may be supplied to disconnect clutch 236 via electric pump 242. Mechanical transmission pump 230 or electric pump 242 supplies hydraulic fluid at line pressure via conduit 239. Line pressure delivered via electric pump 242 may be controlled via adjusting voltage and/or current supplied to electric pump 242. Line pressure delivered via mechanical transmission pump 230 may be controlled via pump efficiency control device or actuator 231 (e.g., swash plate, vane position adjustment device, gear adjustment device, etc.) or optional regulator 232. Conduit 239 may also supplies hydraulic fluid at line pressure to gear transmission clutches 211.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted.

The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

The system of FIGS. 1 and 2 provides for a driveline system, comprising: an engine; an integrated starter/generator; a driveline disconnect clutch positioned in a driveline between the engine and the integrated starter/generator; a transmission including a pump; and a controller including executable instructions stored in non-transitory memory to adjust an outlet pressure of the pump in response to a driver demand torque and a first offset torque. The system further comprises additional instructions to apply the outlet pressure of the pump to the driveline disconnect clutch. The system includes where the outlet pressure of the pump adjusts a torque capacity of the driveline disconnect clutch. The system includes where the outlet pressure is controlled via a pressure regulator. The system includes where the outlet pressure is controlled via adjusting efficiency of the pump. The system includes where the outlet pressure is controlled via voltage or current supplied to the pump.

Figure 4:
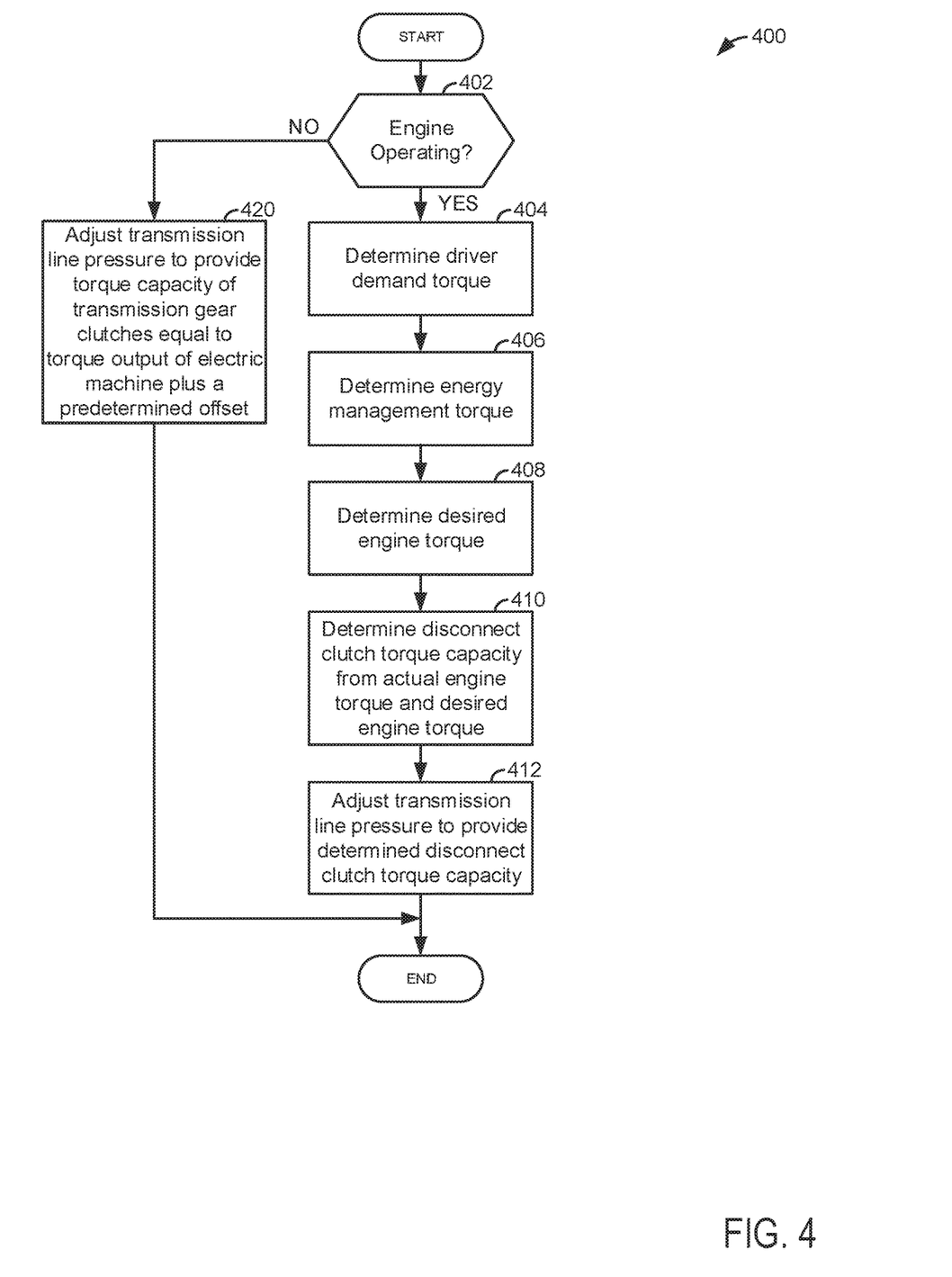
FIG. 4 shows a flowchart of an example method for operating the system shown in FIGS. 1 and 2.

Referring now to FIG. 3, an example plot of a driveline operating sequence according to the method of FIG. 4 is shown. FIG. 3 shows a way of adjusting driveline disconnect clutch torque capacity (e.g., an upper threshold (e.g., maximum) amount of torque a driveline disconnect clutch may transfer when transmission line pressure is applied to closed the driveline disconnect clutch. Vertical lines T0-T3 represent times of interest during the operating sequence. The plots are time aligned and occur at the same time.

The first plot from the top of FIG. 3 is a plot of driver demand torque versus time. The horizontal axis represents time and time increases from the left side of the plot to the right side of the plot. The vertical axis represents driver demand torque and driver demand torque increases in the direction of the vertical axis arrow. In one example, driver demand torque is based on accelerator pedal position and vehicle speed. For example, an accelerator pedal position from a sensor and a vehicle speed may reference a table or function of empirically determined driver demand torque values and the table or function outputs a driver demand value. The driver demand torque may be a wheel torque, an input torque to a transmission, or a torque desired or request at another location along the driveline. Trace 302 represents driver demand torque.

The second plot from the top of FIG. 3 is a plot of energy management torque versus time. The horizontal axis represents time and time increases from the left side of the plot to the right side of the plot. The vertical axis represents energy management torque. Positive energy management torque is requested when trace 304 is above the horizontal axis. Negative energy management torque is requested when trace 304 is below the horizontal axis. The value of trace 304 is zero when trace 304 is not visible. Energy management torque is a torque that may be provided to the driveline or supplied by the driveline via an electric energy storage device (e.g., 275). For example, if electric energy storage device charge is low and charging the electric energy storage device is requested, a negative energy management torque may be requested. Conversely, if electric energy storage device charge is high and discharging of the electric energy storage device is requested, a positive energy management torque may be requested. Trace 304 represents engine management torque.

The third plot from the top of FIG. 3 is a plot of driveline disconnect clutch torque capacity versus time. The vertical axis represents driveline disconnect clutch torque capacity and driveline disconnect clutch torque capacity increases in the direction of the vertical axis arrow. The horizontal axis represents time and time increases from the left side of the plot to the right side of the plot. Trace 306 represents driveline disconnect clutch torque capacity.

The fourth plot from the top of FIG. 3 is a plot of transmission line pressure versus time. The vertical axis represents transmission line pressure and transmission line pressure increases in the direction of the vertical axis arrow. The horizontal axis represents time and time increases from the left side of the plot to the right side of the plot. Trace 308 represents transmission line pressure.

The fifth plot from the top of FIG. 3 is a plot actual engine torque (e.g., torque being produced by the engine) versus time. The horizontal axis represents time and time increases from the left side of the plot to the right side of the plot. The vertical axis represents actual engine torque and actual engine torque increases in the direction of the vertical axis arrow. Trace 310 represents actual engine torque.

At time T0, driver demand torque is at a lower level and energy management torque is zero. The driveline disconnect clutch torque capacity is at a lower value that is equal to the driver demand torque plus a predetermined offset torque (e.g., 20 Newton-meters (N-m)). The transmission line pressure is adjusted to a pressure that provides the driveline disconnect clutch torque capacity. The actual engine torque is nearly equal to the driver demand torque.

Between time T0 and time T1, the driver demand torque changes in response to changes in accelerator pedal position and vehicle speed (not shown). The driveline disconnect clutch torque capacity follows the changes in driver demand torque and it also includes a torque offset. The transmission line pressure is adjusted so that the driveline disconnect clutch torque capacity follows the driver demand torque plus an offset torque. The actual engine torque tracks with the driver demand torque.

At time T1, negative energy management torque is requested so that the vehicle's electric energy storage device may be charged. The energy management torque is negative since torque is being absorbed from the driveline to charge the electric energy storage device. The driveline disconnect clutch torque capacity is increased to equal the driver demand torque minus the negative energy management torque, which increases the driveline disconnect clutch torque capacity. An offset torque is also added to the driveline disconnect clutch torque capacity. The transmission line pressure is adjusted via adjusting transmission pump output or line pressure regulator output so that the driveline disconnect clutch torque follows the driver demand torque minus the negative energy management torque plus the offset torque. The actual engine torque follows the driver demand torque minus the negative energy management torque. The offset torque is delivered by the engine so that the driveline disconnect clutch is greater than the actual engine torque so that the driveline disconnect clutch does not slip.

At time T2, the driver reduces the driver demand torque while energy management torque is being requested. The driveline disconnect clutch torque capacity and the transmission line pressure begin to be reduced in response to the reduction in driver demand torque. The actual engine torque is equal to the driver demand torque minus the energy management torque at the time when the driver demand torque is reduced.

Between time T2 and time T3, the driver demand torque drops at quick rate, but the actual engine torque does not fall as fast as the driver demand torque. The lag in actual engine torque may be attributed to the engine consuming air from the engine intake manifold. The driveline disconnect clutch torque follows the actual engine torque plus an offset torque instead of following driver demand torque minus energy management torque plus the offset torque. The driveline disconnect clutch torque follows the actual engine torque plus the offset torque because it is greater than the driver demand torque minus the energy management torque plus the offset torque. This allows the driveline disconnect clutch torque capacity to be reduced without slipping the driveline disconnect clutch. The transmission line pressure is adjusted to a pressure that provides the driveline disconnect clutch torque capacity that is equal to the actual engine torque plus the offset torque.

At time T3, the energy management torque is reduced to zero and the driveline disconnect clutch torque capacity is reduced by a corresponding amount of torque capacity. The transmission line pressure is also reduced so that the driveline disconnect clutch torque capacity is equal to the driver demand torque plus the offset torque. The actual engine torque follows the driver demand torque. After time T3, the driver demand torque changes responsive to accelerator pedal position and vehicle speed. The driveline disconnect clutch torque capacity and the transmission line pressure are adjusted to follow the driver demand torque plus an offset torque. The actual engine torque follows the driver demand torque.

Referring now to FIG. 4, an example flowchart for operating a driveline of a hybrid vehicle is shown. At least portions of the method of FIG. 4 may be incorporated as executable instructions stored in non-transitory memory of the system shown in FIGS. 1 and 2. Additionally, portions of the method of FIG. 4 may take place in the physical world as operations or actions performed by a controller to transform an operating state of one or more devices. The method of FIG. 4 may also provide the operating sequence shown in FIG. 3.

At 402, method 400 judges if the hybrid vehicle's engine is operating. In one example, the engine may be judged to be operating (e.g., combusting air and fuel) if engine speed is greater than a threshold and fuel is being supplied to the engine. If method 400 judges that the vehicle's engine is operating, the answer is yes and method 400 proceeds to 404. Otherwise, the answer is no and method 400 proceeds to 420.

At 420, method 400 adjusts transmission line pressure to provide a torque capacity of transmission gear clutches that holds the transmission clutches closed when they are commanded closed. In one example, the torque capacity of the engaged transmission clutch is equal to the absolute value of electric machine torque output plus a second offset torque multiplied by the torque converter multiplication ratio multiplied by any gear ratios between the torque converter and the engaged gear clutch. For example, if output torque of the electric machine is 100 N-m, the second offset value is 10 N-m, the torque converter torque multiplication ratio is 1, and no gears a present between the engaged gear clutch and the torque converter, the torque capacity of the engaged transmission clutch is adjusted to 110 N-m. Method 400 proceeds to exit.

At 404, method 400 determines driver demand torque. In one example, driver demand torque is determined via receiving a position of an accelerator pedal and vehicle speed into a controller. The controller then references a table or function of empirically determined values that are stored in controller memory and the table or function outputs a driver demand torque. Further, in some examples, the driver demand torque may also be based on brake pedal position. For example, the driver demand torque may be expressed via the following equation:

$$\tau_{dd} = \tau_{acc\_ped} + \tau_{brk\_ped}$$

where $\tau_{dd}$ is driver demand torque, $\tau_{acc\_ped}$ is accelerator pedal requested torque, and $\tau_{brk\_ped}$ is brake pedal requested torque (negative values). Thus, if an accelerator pedal position is applied and it indicates a positive requested torque of 300 N-m and the brake pedal is contemporaneously applied with the accelerator pedal and it indicates a negative request of 50 N-m, the driver demand torque is 250 N-m. The driver demand torque may be a requested wheel torque, transmission input torque, or torque at another location of the driveline. Method 400 proceeds to 406.

At 406, method 400 determines an energy management torque. The energy management torque is determined via logic that is responsive to driver demand torque, battery state of charge, battery temperature, and other vehicle operating conditions. The energy management torque determines an amount of torque delivered to or absorbed from the driveline via the ISG and the electric energy storage device. Torque absorbed from the driveline via the electric machine and stored as electrical charge in the electric energy storage device may be referred to as negative torque. Torque supplied to the driveline via the electric machine and the electric energy storage device may be referred to as positive torque. In one example, if driver demand torque is 300 N-m and the engine has capacity to output 250 N-m, the energy management torque may be 50 N-m supplied to the driveline via the electric machine. If the battery state of charge is low, 25 N-m of negative torque may be applied to the driveline via the electric machine. The electric machine may convert the torque to charge for storage in the electric energy storage device. Method 400 proceeds to 408.

At 408, method 400 determines a desired engine torque. In one example, the desired engine torque may be determined via the following equation:

$$\tau_{des\_eng} = \tau_{dd} - \tau_{EM}$$

where $\tau_{des\_eng}$ is the desired engine torque, $\tau_{dd}$ is driver demand torque, and $\tau_{EM}$ is energy management torque. Method 400 proceeds to 410 after determining the desired engine torque.

At 410, method 400 determines a desired driveline disconnect clutch torque capacity (e.g., an upper threshold amount of torque the driveline disconnect clutch may transfer when transmission line pressure is applied to the driveline disconnect clutch). In one example, method 400 determines the desired driveline disconnect clutch via the following equation:

$$\tau_{des\_ddc} = \max(\tau_{des\_eng}, \tau_{act\_eng}) + \text{offset\_torque}$$

where $\tau_{des\_ddc}$ is the desired driveline disconnect clutch torque capacity, max is a function that returns the greater value of arguments $\tau_{des\_eng}$ and $\tau_{act\_eng}$, $\tau_{des\_eng}$ is the desired engine torque, $\tau_{act\_eng}$ is actual engine torque (e.g., torque presently output by the engine), and offset_torque is a first offset torque.

In one example, the first offset torque may be based on an upper threshold (e.g., maximum) rate of positive torque change across the driveline disconnect clutch. For example, if the electric machine is off and the maximum engine torque rate of change is 100 N-m per second, the offset value may be selected to be 50 N-m so that it takes the engine at least 0.5 seconds to reach a condition where the rate of change torque across the driveline disconnect clutch overcomes the offset value and driveline disconnect clutch begins to slip. Thus, the offset torque may be a torque that allows a torque difference between an input side of the driveline disconnect clutch minus a torque on the output side of the driveline disconnect clutch to increase without the driveline disconnect clutch slipping for a predetermined amount of time.

In another example, the first offset may be a predetermined value (e.g., 40 N-m) and driveline disconnect clutch torque capacity may be increased at an upper threshold rate (e.g., maximum rate) of 50 N-m per second, but engine torque may increase at a rate of 100 N-m per second, then the engine machine torque may be allowed to increase at a rate of 100 N-m per second for 0.2 seconds while the driveline disconnect clutch torque capacity is increased at a rate of 50 N-m per second in response to a driver demand torque increase of 100 N-m per second. Thereafter, the engine torque may be limited to a threshold rate of 50 N-m per second, or the maximum rate of increase of the torque capacity of the driveline disconnect clutch. The engine torque may be limited via limiting a rate of throttle opening and/or fuel injection amount. This allows the engine torque to increase by 20 N-m while the driveline disconnect clutch torque capacity increases by 10 N-m, yet the disconnect clutch torque capacity is still greater than the engine torque output by 30 N-m so that the driveline disconnect clutch does not slip. In this way, the torque change across the driveline disconnect clutch may be limited to reduce the possibility of driveline disconnect clutch slipping when the rate of torque increase across the driveline disconnect clutch exceeds the rate torque capacity of the driveline disconnect clutch may be increased. Method 400 proceeds to 412.

At 412, method 400 adjusts transmission line pressure to provide the desired driveline disconnect clutch torque capacity. In one example, output of a pressure regulator may be adjusted to provide a line pressure that when applied to the driveline disconnect clutch provides the desired driveline disconnect clutch torque capacity. In another example, output pressure of the transmission pump (mechanical or electrical) may be adjusted to provide the desired driveline disconnect clutch torque capacity. In one example, a desire driveline disconnect clutch torque capacity is input to a function that outputs a transmission line pressure. For example, the desired driveline disconnect clutch torque capacity is an input to a function that holds empirically determined values of line pressure that provide the desired driveline disconnect clutch torque capacity, and each line pressure value is associated with a corresponding desired driveline disconnect clutch torque capacity. The function then outputs the desired transmission line pressure and the transmission line pressure is adjusted via adjusting output of the transmission pump to provide the desired line pressure. In particular, the controller adjusts output of the transmission pump via supplying a voltage or current to adjust pump output. If the transmission pump is an electrically driven pump, a voltage input to the pump is adjusted to change transmission line pressure. If the pump is mechanically driven, an actuator within the pump adjusts pump efficiency to change transmission line pressure. Similarly, if the transmission line pressure is regulated via a pressure regulator, the desired driveline disconnect clutch torque capacity is an input to a function that holds empirically determined values of line pressure that provide the desired driveline disconnect clutch torque capacity and the function outputs a regulator control voltage or signal duty cycle and the controller commands the pressure regulator via a voltage or duty cycle signal. The values in the function may be empirically determined and stored in controller memory. Method 400 proceeds to exit.

In this way, driveline disconnect clutch torque capacity may be adjusted when a vehicle is traveling on a road and driver demand torque is changing. The driveline disconnect clutch torque capacity is adjusted to allow the driver demand torque to be transferred across the driveline disconnect clutch plus a small additional amount of torque. This ensures that the driveline disconnect clutch stays closed and does not slip while reducing transmission line pressure to less than an upper threshold transmission line pressure. Thus, energy to operate the driveline may be reduced.

Thus, method 400 provides for a driveline operating method, comprising: receiving a driver demand torque to a controller; and adjusting a torque capacity of a driveline disconnect clutch via the controller responsive to the driver demand torque and an offset torque. The method includes where the offset torque is a torque that is based on a upper threshold rate of change of torque of an engine. The method includes where the driver demand torque is a function of accelerator pedal position. The method includes where the driver demand torque is also a function of brake pedal position. The method includes where the driveline disconnect clutch is positioned in a driveline between an engine and an electric machine. The method includes where the electric machine is positioned in the driveline between the disconnect clutch and a transmission. The method includes where adjusting a torque capacity of a driveline disconnect clutch via the controller responsive to the driver demand torque and an offset torque occurs when an engine of a driveline is operating, and where the torque capacity of the driveline disconnect clutch is not adjusted via the controller responsive to the driver demand torque and the offset torque when an integrated starter/generator is operating and the engine of the driveline is not operating.

The method of FIG. 4 also provides for a driveline operating method, comprising: receiving a driver demand torque to a controller; and adjusting a torque capacity of a driveline disconnect clutch via adjusting a line pressure output from a transmission pump and the controller in response to the driver demand torque and a first offset torque. The method further comprises adjusting the line pressure output from the transmission pump in further response to an energy management torque. The method further comprises adjusting the line pressure output from the transmission pump in further response to an actual engine torque. The method includes where the transmission pump is an electric pump. The method includes where the transmission pump is a mechanically driven pump. The method further comprises adjusting the torque capacity of transmission gear clutches responsive to the driver demand torque and a second offset torque when an integrated starter/generator is operating and an engine of the driveline is not operating. The method further comprises constraining a rate of torque change across the driveline disconnect clutch based on the first offset torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
receiving a driver demand torque to a controller, where the driver demand torque is a function of accelerator pedal position;
determining a desired engine torque from the driver demand torque when an electric machine torque is non-zero; and
adjusting a torque capacity of a driveline disconnect clutch via the controller to equal the desired engine torque plus an offset torque, where adjusting the torque capacity of the driveline disconnect clutch via the controller to equal the desired engine torque plus the offset torque is performed during a first condition, and further comprising adjusting the torque capacity of the driveline disconnect clutch via the controller to equal an actual engine torque plus the offset torque during a second condition.

2. The method of claim 1, where the offset torque is a torque that is based on an upper threshold rate of change of torque of an engine.

3. The method of claim 1, where the driver demand torque is also a function of brake pedal position.

4. The method of claim 1, where the driveline disconnect clutch is positioned in a driveline between an engine and an electric machine.

5. The method of claim 4, where the electric machine is positioned in the driveline between the disconnect clutch and a transmission.

6. The method of claim 1, where adjusting the torque capacity of the driveline disconnect clutch via the controller responsive to the driver demand torque and the offset torque occurs when an engine of a driveline is operating, and where the torque capacity of the driveline disconnect clutch is not adjusted via the controller responsive to the driver demand torque and the offset torque when an integrated starter/generator is operating and the engine of the driveline is not operating.

7. A driveline operating method, comprising:

receiving a driver demand torque to a controller;

determining an engine torque from the driver demand torque when an electric machine torque is non-zero; and via the controller, adjusting a torque capacity of a driveline disconnect clutch to equal the engine torque plus a first offset torque via adjusting a line pressure output from a transmission pump where the transmission pump is a mechanically driven pump, and where adjusting the torque capacity of the driveline disconnect clutch to equal the desired engine torque plus the offset torque is performed during a first condition, and further comprising adjusting the torque capacity of the driveline disconnect clutch via the controller to equal an actual engine torque plus the first offset torque during a second condition.

8. The method of claim 7, further comprising adjusting the line pressure output from the transmission pump in further response to an energy management torque.

9. The method of claim 7, further comprising adjusting the line pressure output from the transmission pump in further response to the actual engine torque.

10. The method of claim 7, where the transmission pump is an electric pump.

11. The method of claim 7, further comprising adjusting the torque capacity of transmission gear clutches responsive to the driver demand torque and a second offset torque when an integrated starter/generator is operating and an engine of a driveline is not operating.

12. The method of claim 7, further comprising constraining a rate of torque change across the driveline disconnect clutch based on the first offset torque.

* * * * *